(12) United States Patent
Matsushima et al.

(10) Patent No.: US 8,944,197 B2
(45) Date of Patent: Feb. 3, 2015

(54) INTAKE STRUCTURE FOR SADDLE-RIDE TYPE VEHICLE

(71) Applicant: Honda Motor Co., Ltd., Tokyo (JP)

(72) Inventors: Satoshi Matsushima, Wako (JP); Yusuke Inoue, Wako (JP); Yusaburo Tani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/752,092

(22) Filed: Jan. 28, 2013

(65) Prior Publication Data

US 2013/0240276 A1 Sep. 19, 2013

(30) Foreign Application Priority Data

Mar. 15, 2012 (JP) ................ 2012-058762
Mar. 15, 2012 (JP) ................ 2012-058763

(51) Int. Cl.

| F02M 35/00 | (2006.01) |
|---|---|
| B60K 13/02 | (2006.01) |
| F02M 35/10 | (2006.01) |
| F02M 35/02 | (2006.01) |
| B62K 11/04 | (2006.01) |
| F02M 35/16 | (2006.01) |
| F02M 35/04 | (2006.01) |
| B62J 1/12 | (2006.01) |
| B62J 17/00 | (2006.01) |
| F02B 61/02 | (2006.01) |

(52) U.S. Cl.
CPC .......... *B60K 13/02* (2013.01); *F02M 35/10091* (2013.01); *F02M 35/0201* (2013.01); *F02M 35/10262* (2013.01); *B62K 11/04* (2013.01); *F02M 35/162* (2013.01); *F02M 35/048* (2013.01); *F02M 35/10013* (2013.01); *B62J 1/12* (2013.01); *B62J 17/00* (2013.01); *F02B 61/02* (2013.01)
USPC ....................................................... 180/68.3

(58) Field of Classification Search
CPC .......... B60K 13/02; B60K 13/06; B62J 1/00; B62J 1/08; F02M 35/00; F02M 35/02; F02M 35/04; F02M 35/0201; F02M 35/0204; F02M 35/10; F02M 35/10013; F02M 35/10006; F02M 35/16; F02M 35/10091; F02M 35/10262
USPC ....................................................... 180/68.3
See application file for complete search history.

(56) References Cited

U.S. PATENT DOCUMENTS

| 4,509,613 A * | 4/1985 | Yamaguchi ................. 180/219 |
| 4,611,679 A * | 9/1986 | Yanagishita et al. ........ 180/68.3 |

(Continued)

FOREIGN PATENT DOCUMENTS

| EP | 2042414 A1 * | 4/2009 | ............... B62J 1/12 |
| JP | 2006273324 A | * 10/2006 | |
| JP | 2009-234402 A | 10/2009 | |

*Primary Examiner* — J. Allen Shriver, II
*Assistant Examiner* — Steve Clemmons
(74) *Attorney, Agent, or Firm* — Birch, Stewart, Kolasch & Birch, LLP

(57) ABSTRACT

An intake structure for a saddle-ride type vehicle for increasing the degree of freedom of the length of a duct associated with an intake air cleaner case disposed below a seat. An air taking-in port is provided in a lid member serving as a portion of an upper wall of an air cleaner case located below a seat. A concave portion is formed on an upper wall surface communicating with the taking-in port. The concave portion and a bottom plate of the seat facing the concave portion forms a pseudo duct-like intake passage communicating with the taking-in port. A side cover is provided with a stepped surface extending toward the inside of a vehicle from an external surface thereof. An opening, opened downwardly, is provided in the stepped surface to improvement in intake performance and to reduce dust and the like from entering.

10 Claims, 17 Drawing Sheets

(56) References Cited

U.S. PATENT DOCUMENTS

| | | | |
|---|---|---|---|
| RE34,072 E * | 9/1992 | Asakura et al. | 180/68.3 |
| 6,695,083 B2 * | 2/2004 | Nakamura et al. | 180/68.1 |
| 7,284,629 B2 * | 10/2007 | Nakano et al. | 180/68.3 |
| 7,549,675 B2 * | 6/2009 | Satake et al. | 280/835 |
| 2002/0040699 A1 * | 4/2002 | Yokoyama et al. | 123/184.21 |
| 2006/0272872 A1 * | 12/2006 | Isoda | 180/68.3 |
| 2006/0272873 A1 * | 12/2006 | Isoda et al. | 180/68.3 |
| 2009/0242305 A1 * | 10/2009 | Asano | 180/219 |
| 2011/0067367 A1 * | 3/2011 | Yamamoto et al. | 55/385.3 |
| 2011/0232983 A1 * | 9/2011 | Abe et al. | 180/68.3 |

* cited by examiner

INTAKE STRUCTURE FOR SADDLE-RIDE TYPE VEHICLE

CROSS-REFERENCE TO RELATED APPLICATIONS

The present application claims priority under 35 USC 119 to Japanese Patent Application No. 2012-058762 filed Mar. 15, 2012 and Japanese Patent Application No. 2012-058763 filed Mar. 15, 2012 the entire contents of which are hereby incorporated by reference.

BACKGROUND OF THE INVENTION

1. Field of the Invention

The present invention relates to an intake structure for a saddle-ride type vehicle.

2. Description of Background Art

The following known intake structure is described using the reference numerals set forth in Japanese Patent Laid-open No. 2009-234402. The intake structure for a saddle-ride type vehicle includes an engine (7) disposed between front and rear wheels (24, 28), an occupant's seat (14) installed to extend from above the engine (7) to the rear thereof, and an intake air cleaner case (60) for air intake installed below the seat (14). Occupant's foot-rest steps (not shown) are disposed below the seat (14) and between front and rear wheels (24, 28). A side cover (not shown) is provided that covers a side surface of the intake air cleaner case at a position below the seat. A duct (72) forming a taking-in portion adapted to take air in the intake air cleaner case (60) is opened to the rear from the rear portion of the air cleaner case. A body frame (1) is provided for mounting these components.

The conventional intake structure for a saddle-ride type vehicle described above is such that the duct (72) forming the taking-in portion for supplying air to the intake air cleaner case (60) is opened from the rear portion of the intake air cleaner case (60) toward the rear. Therefore, it is not necessarily easy to obtain a desired length of the duct in a limited space below the seat.

SUMMARY AND OBJECTS OF THE INVENTION

It is an object of an embodiment of the present invention to provide an intake structure for a saddle-ride type vehicle that can increase the degree of freedom of the length of a duct associated with an intake air cleaner case for air intake disposed below a seat.

It is a further object of an embodiment of the present invention to provide an intake structure for a saddle-ride type vehicle that can concurrently achieve a further improvement in intake performance and a reduction of entering dust or the like.

To solve the above problem, an intake structure for a saddle-ride type vehicle includes a saddle-ride type vehicle having an engine disposed between a front wheel and a rear wheel; an occupant's seat disposed to extend from above the engine to the rear thereof; and an intake air cleaner case for air intake installed below the seat. An air taking-in port is provided at a portion of an upper wall of the intake air cleaner case with a concave portion being formed on an upper wall surface communicating with the taking-in port. The concave portion and a bottom plate of the seat facing the concave portion forms an intake passage communicating with the taking-in port.

According to the intake structure for the saddle-ride type vehicle according to an embodiment of the present invention, the air taking-in port is provided at a portion of the upper wall of the intake air cleaner case. The concave portion and the bottom plate of the seat form the intake passage communicating with the taking-in port.

While this intake passage might not be a complete duct, it is configured as an intake passage similar to a duct (i.e., a pseudo duct) by the concave portion of the upper wall surface of the intake air cleaner case and the bottom plate of the seat.

Therefore, the present invention can make the intake passage (i.e., the pseudo duct) lengthwise compared with the conventional technology in which the duct is installed to extend to the rear from the rear portion of the air cleaner case.

In addition, the upper portion of the pseudo duct is formed of the bottom plate of the seat and the capacity of the intake air cleaner case can easily be ensured accordingly. As a result, it is possible to improve the intake performance of the intake air cleaner case.

The taking-in port and the concave portion can form a lid member opened and closed when an element installed in the intake air cleaner case is replaced, the lid member being formed with a duct portion covering one end of the taking-in port, and a length of a guide wall of the duct portion opposed to the taking-in port can be made shorter than an length of the taking-in port, the length extending in a direction toward the concave portion.

With this configuration, the taking-in port and the concave portion are formed in the lid member. Therefore, the taking-in port and the concave portion can easily be formed compared with the case of being formed on the case body.

The taking-in port is formed with the duct portion covering one end of the taking-in portion. Therefore, the operation of the duct portion can increase the intake efficiency.

The length of the guide wall of the duct portion is made shorter than the length of the taking-in port, the length extending in the direction toward the concave portion. Therefore, the lid member having such a duct portion can be formed as a vertical division type.

More specifically, the configuration described above can increase the intake efficiency and concurrently the taking-in port and the concave portion can easily be formed.

A bottom plate of the seat can be formed with a seat side concave portion opposed to the concave portion and concaved upward.

The configuration described above can increase the degree of freedom of the magnitude of the transverse sectional area of the intake passage and concurrently increase the rigidity of the bottom plate of the seat. As a result, while enhancing ride quality, a savings in the weight of the vehicle can be achieved.

The taking-in port can be provided at an end portion of the intake air cleaner case in a front-back direction of the vehicle and the seat side concave portion can be formed to extend in the front-back direction along a longitudinal direction of the seat.

The configuration described above can form the pseudo duct longer to increase the intake efficiency and concurrently increase also the rigidity of the seat.

The seat can be supported above a frame extending in the front-back direction on the left and right of the seat and left and right sidewalls of the intake passage can be formed of the frame.

With the configuration described above, the frame can effectively be used to form the elongate pseudo duct and also a savings in the weight of the vehicle can be achieved.

To solve the above problem, an intake structure for a saddle-ride type vehicle according to an embodiment of the present invention includes a saddle-ride type vehicle including an engine disposed between front and rear wheels; an occupant's seat installed to extend from above the engine to the rear thereof; occupant's foot-rest steps disposed below the seat and between the front and rear wheels; an intake air cleaner case installed behind the engine and below the seat; a side cover that covers a side surface of the intake air cleaner case at a position below the seat; and a body frame to which these components are mounted.

The side cover is provided with a stepped surface extending toward the inside of the vehicle from an external surface thereof, an opening that is opened downwardly is provided in the stepped surface at a position not overlapping, as viewed from the side, a leg of an occupant who sits on the seat and takes a posture of putting her or his feet on the steps. A taking-in port, adapted to take air into the intake air cleaner case, is provided in a side surface of the air cleaner case with an air introduction passage extending from the opening toward the taking-in port being formed on the inside of the side cover.

According to the intake structure for a saddle-ride type vehicle, air is taken in from the opening provided in the side cover, through the air introduction passage formed inside the side cover and through the taking-in port of the cleaner case into the intake air cleaner case. The taking-in port is covered by the side cover. The opening is installed in the stepped surface extending from the external surface of the side cover toward the inside of the vehicle so as to be opened downwardly. Therefore, entering of dust or the like into the opening can be suppressed. Thus, dust or the like entering the intake air cleaner case can be reduced.

The side cover is provided with the stepped surface extending from its external surface toward the inside of the vehicle. The stepped surface is provided with the opening which is opened downward at a position not overlapping, as viewed from the side, a leg of an occupant who sits on the seat and takes a posture of putting her or his feet on the steps. The air introduction passage extending from the opening toward the taking-in port is formed inside the side cover. Therefore, although the side surface of the air cleaner case is provided with the air taking-in port, an amount of taken-in air can be ensured while maintaining the external appearance of the vehicle. In other words, the opening is provided in the stepped portion extending from the external surface of the side cover toward the inside of the vehicle at a position not overlapping, as viewed from the side, a leg of an occupant who sits on the seat and takes a posture of putting her or his feet on the steps. The situation where the opening is blocked by the occupant's leg rarely occurs and is inconspicuous from the outside. Therefore, while maintaining the external appearance of the vehicle, an amount of taken-in air can be ensured. In addition, it becomes hard for the opening to suck in mud or sand thrown up by other vehicles.

The side cover is composed of an upper cover and a lower cover. The stepped surface and the opening are provided at a lower side of the upper cover. The lower cover is configured as a muffler cover having a bulging portion which bulges laterally outwardly of the vehicle and covers a muffler of the vehicle. An upper surface of the muffler cover bulging portion is configured to face the opening with an interval therebetween.

With this configuration, the opening can be made inconspicuous by the bulging portion of the muffler cover. Therefore, it is possible to improve the external appearance of the vehicle.

The bending passage extending from the upper surface of the bulging portion of the muffler cover toward the opening is formed. Therefore, dust or the like entering the opening can be reduced.

An upper side of the muffler cover can be installed along a lower edge of a body frame on which the intake air cleaner case is mounted and a portion of the air introduction passage can be formed by the body frame.

With this configuration, a portion of the air introduction passage can be formed by the body frame. Therefore, the lower cover can be accordingly reduced in size.

The body frame can have a seat support portion supporting the seat and a tilt portion supporting the seat support portion from obliquely below and the taking-in port of the intake air cleaner case can be disposed in a narrow angle portion formed between the seat support portion and the tilt portion.

With this configuration, the air introduction passage can be formed by effectively using the frame and concurrently it is possible to make use of the frame as a prevention wall for dust or the like.

The taking-in port can be provided in only one of the side surfaces of the intake air cleaner case and an intake passage extending from the intake air cleaner case toward the engine is installed so as to be offset toward the other of the side surfaces.

With this configuration, the other side surface of the intake air cleaner case can be made to act as a reflection surface for air flowing in the case from the taking-in port. In addition, the flow of air from the taking-in port toward the intake passage can be made smooth to improve intake performance.

A rib forming the air introduction passage can be installed on an inner surface of the side cover.

With this configuration, the flow of air in the air introduction passage can be made smooth and concurrently the strength of the side cover can be increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
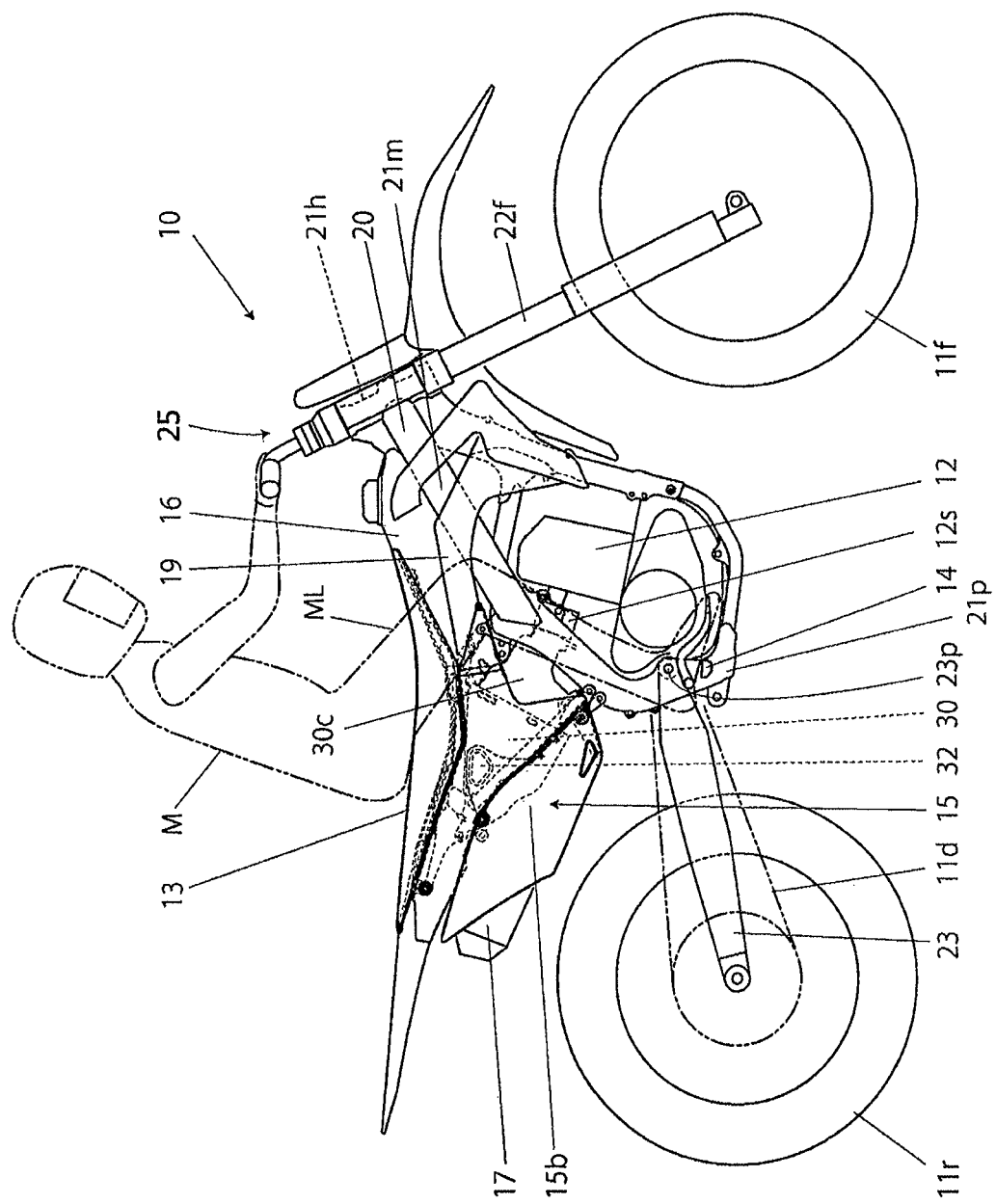
FIG. 1 is a lateral view of a motorcycle as an example of a saddle-ride type vehicle to which an embodiment of an intake structure for a saddle-ride type vehicle according to the present invention is applied.

An embodiment of an intake structure for a saddle-ride type vehicle according to the present invention will hereinafter be described with reference to the drawings. It is to be noted that identical or corresponding portions in the figures are denoted with like reference numerals.

Figure 3:
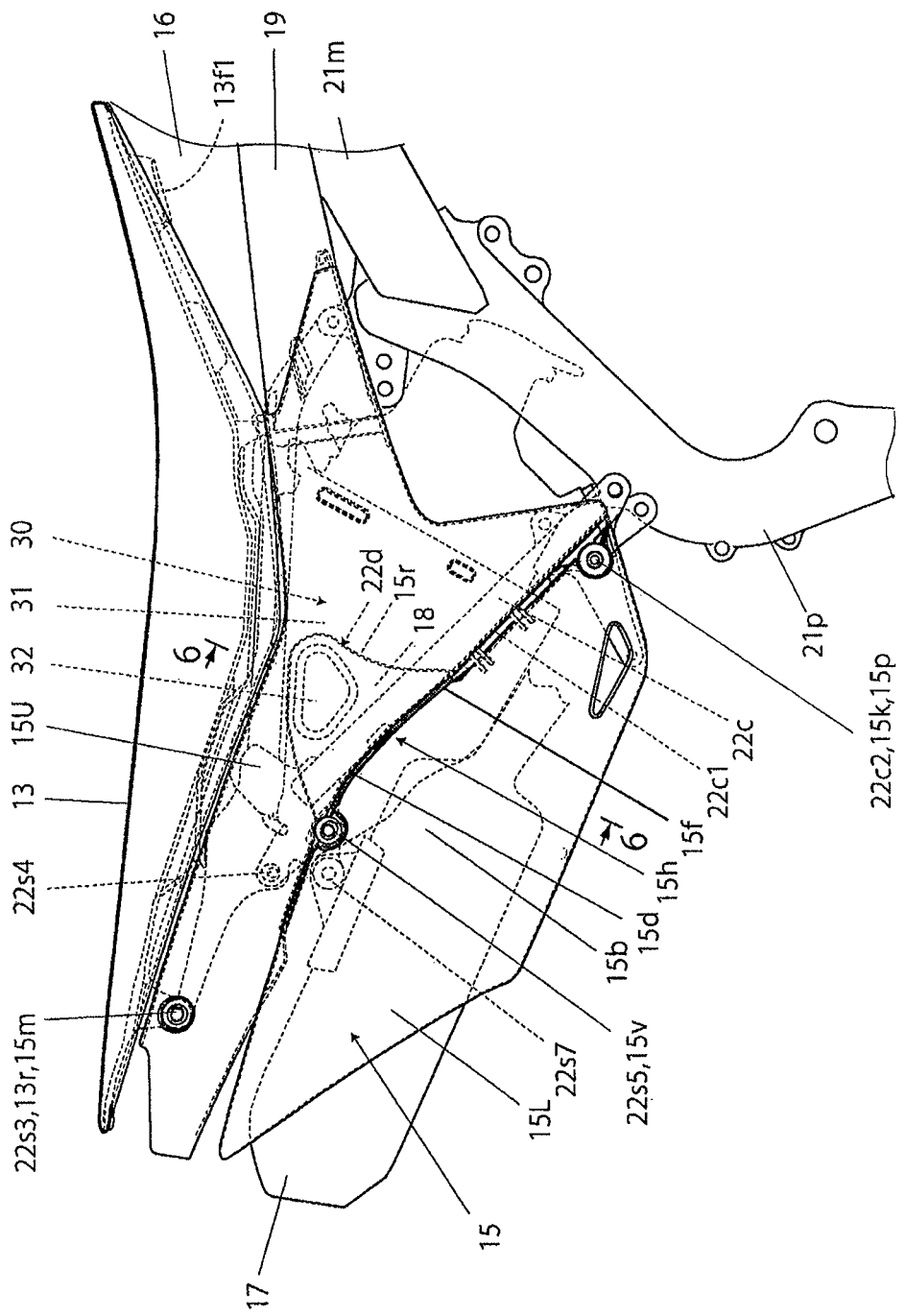
FIG. 3 is a partial enlarged view of FIG. 1.
Figure 11:
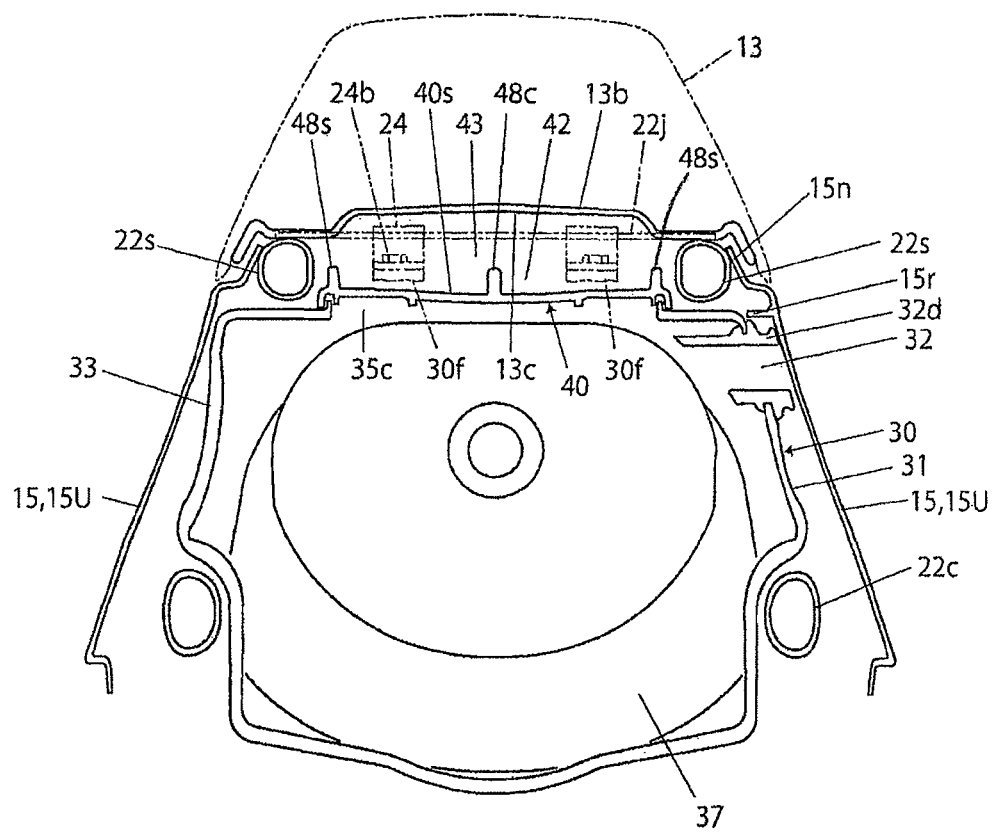
FIG. 11 includes a cross-sectional lateral view of a seat, and cross-sectional views of associated portions of the seat.

A saddle-ride type vehicle 10 shown in FIG. 1 is a motorcycle. The vehicle 10 includes an engine 12 disposed between a front wheel 11f and a rear wheel 11r. A seat 13 for an occupant M is installed to extend above and rearward of the engine 12. Foot-rest steps 14 for an occupant M are installed below the seat 13 and between the front wheel 11f and the rear wheel 11r. An air cleaner case 30 for air intake is installed behind the engine 12 and below the seat 13. As can be seen in FIGS. 3 and 11, for example, a cover 15 is provided for covering the side surface of the intake air cleaner case (hereinafter, also simply called the cleaner case) 30 at a position below the seat 13. A body frame 20 is provided to which these components (the front wheel 11f, the rear wheel 11r, the engine 12, the seat 13, the step 14, the intake air cleaner case 30 and the side cover 15) are mounted.

Figure 2:
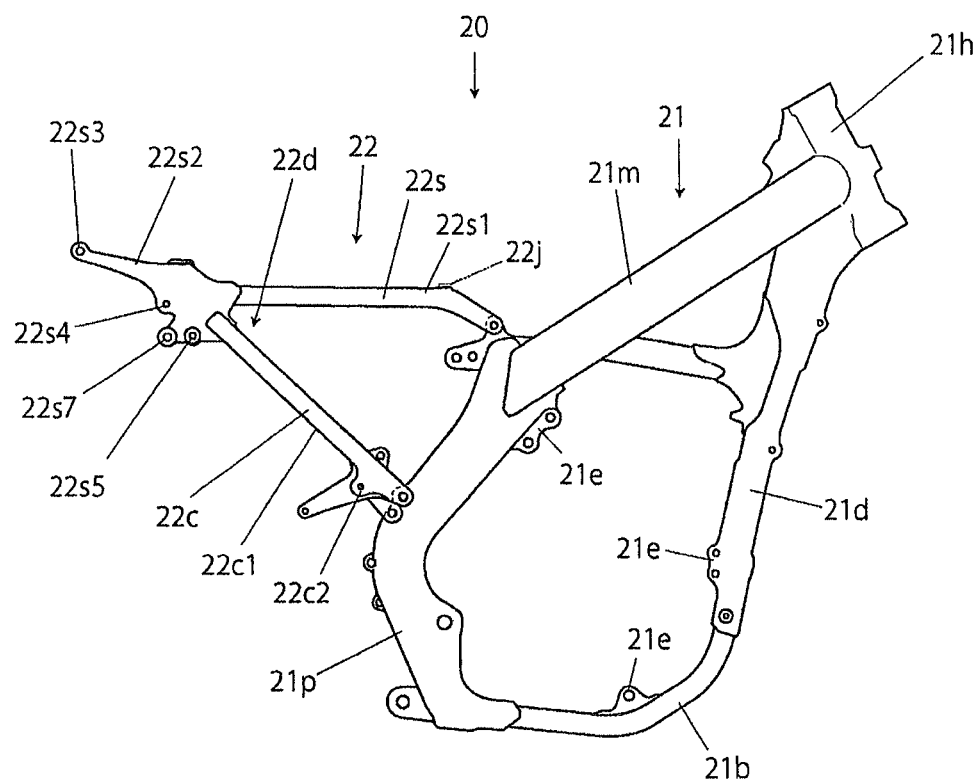
FIG. 2 is a lateral view of a body frame of the motorcycle.

As shown in FIG. 2, the body frame 20 includes a main frame 21 and a rear frame 22 joined to the rear portion of the main frame 21.

The main frame 21 includes a head pipe 21h; a main pipe 21m extending rearward from the head pipe 21h; a pivot plate 21p extending obliquely rearwardly and downwardly from the rear portion of the main pipe 21m; a down pipe 21d extending obliquely rearwardly and downwardly from the head pipe 21h; a lower pipe 21b connecting the lower end of the down pipe 21d with the pivot plate 21p; and engine mounting portions 21e.

As shown in FIGS. 1 and 2, a steering device 25 is mounted on the head pipe 21h. The front wheel 11f is rotatably attached to the lower end of a pair of front forks 22f of the steering device 25. The engine 12 is mounted on the engine mounting portions 21e. A swing arm 23 is swingably attached to the pivot plate 21p via the pivot shaft 23p. The rear wheel 11r is rotatably attached to the rear end of the swing arm 23. The rear wheel 11r is driven by the engine 12 via the drive chain 11d. A pair of left and right steps 14 is secured to the pivot plate 21p. A fuel tank 16 is mounted on the main pipe 21m in the front portion of the seat 13.

Figure 4:
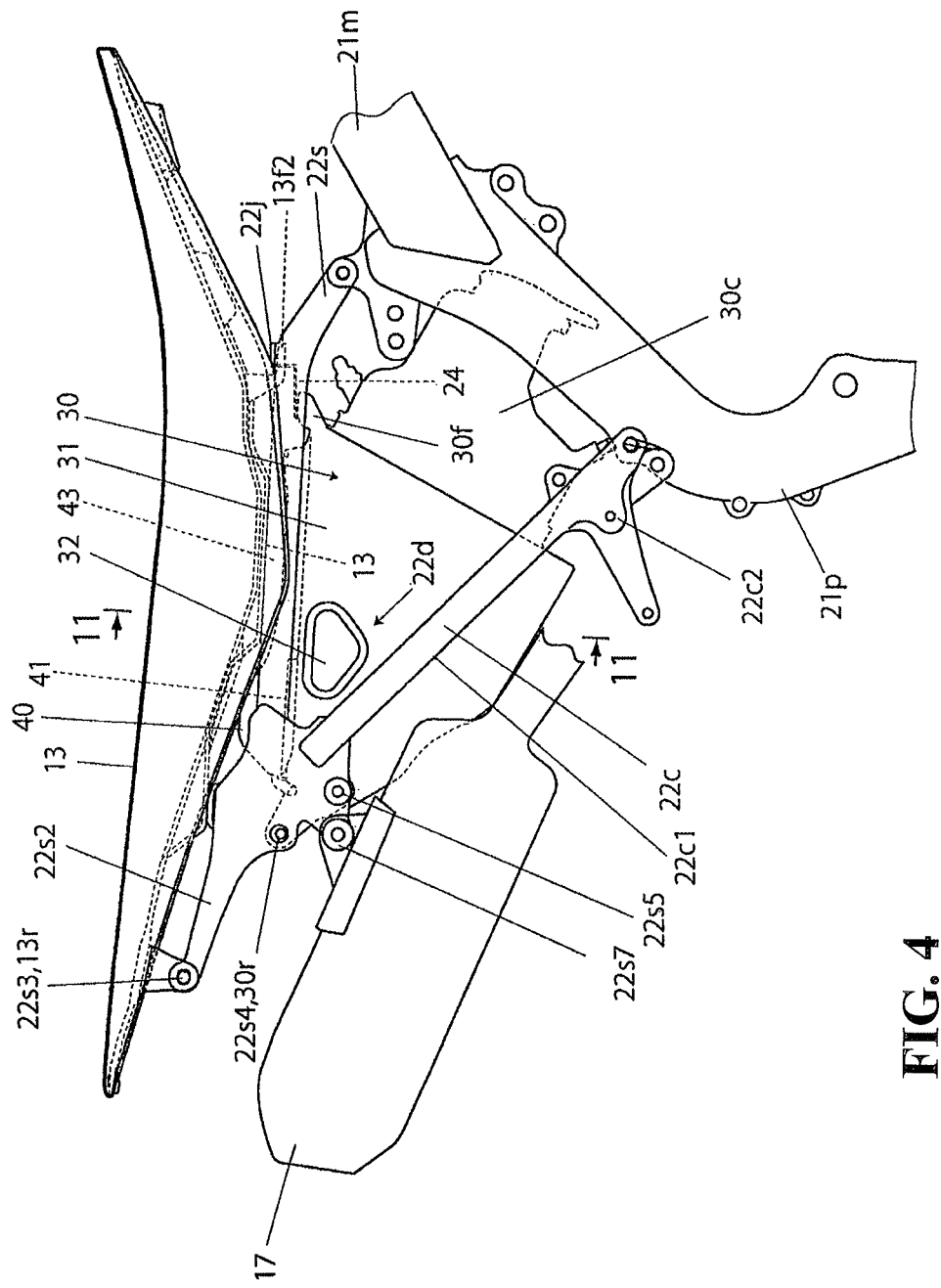
FIG. 4 is a partial enlarged view of FIG. 1 with a side cover removed.

As shown in FIGS. 2 to 4, the rear frame 22 includes a seat support portion 22s supporting the seat 13 and a tilt portion 22c supporting the seat support portion 22s from obliquely below. The seat support portion 22s includes a pair of left and right seat rails 22s1 (only one is shown) extending generally horizontally; and a pair of left and right rear plates 22s2 extending rearward of the seat rail 22s1 and slightly upwardly. The tilt portion 22c is secured via the rear plate 22s2. The rear frame 22 is joined to the main frame 21 by being fixedly fastened at its leading end to the main frame 21 by means of a bolt and a nut (not shown).

The rear plate 22s2 of the rear frame 22 has a seat securing portion 22s3, an air cleaner case securing portion 22s4, a side cover securing portion 22s5 and a muffler securing portion 22s7. The seat 13 is fixedly fastened to the seat securing portion 22s3 by means of a bolt and a nut (not shown). The rear portion of the cleaner case 30 is fixedly fastened to the air cleaner case securing portion 22s4 by means of a bolt and a nut (not shown). The side cover 15 is fixedly fastened to the side cover securing portion 22s5 by means of a bolt and a nut (not shown). The muffler 17 is fixedly fastened to the muffler securing portion 22s7 by means of a bolt and a nut (not shown).

Figure 5:
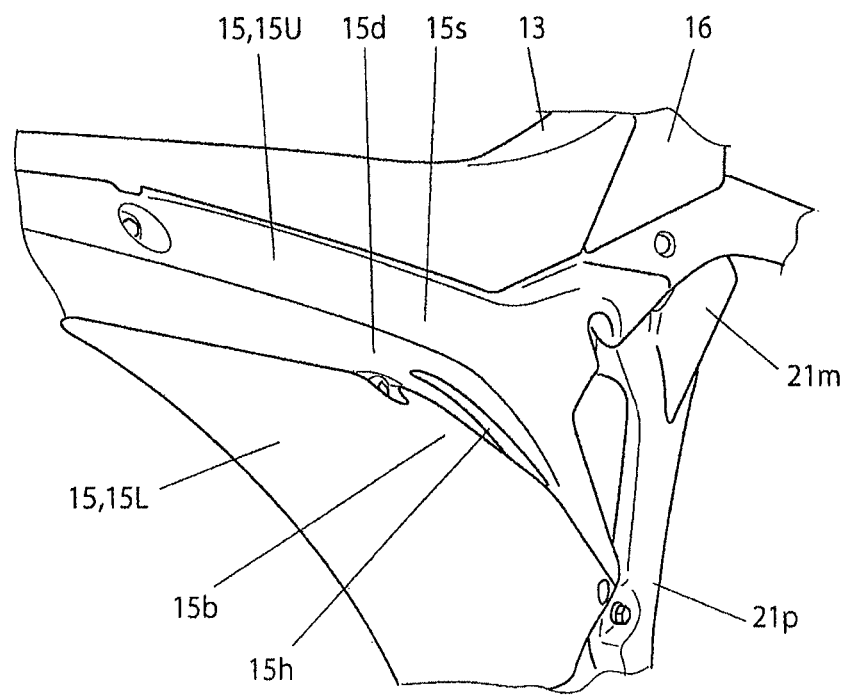
FIG. 5 is a perspective view of an intake air cleaner case.
Figure 6:
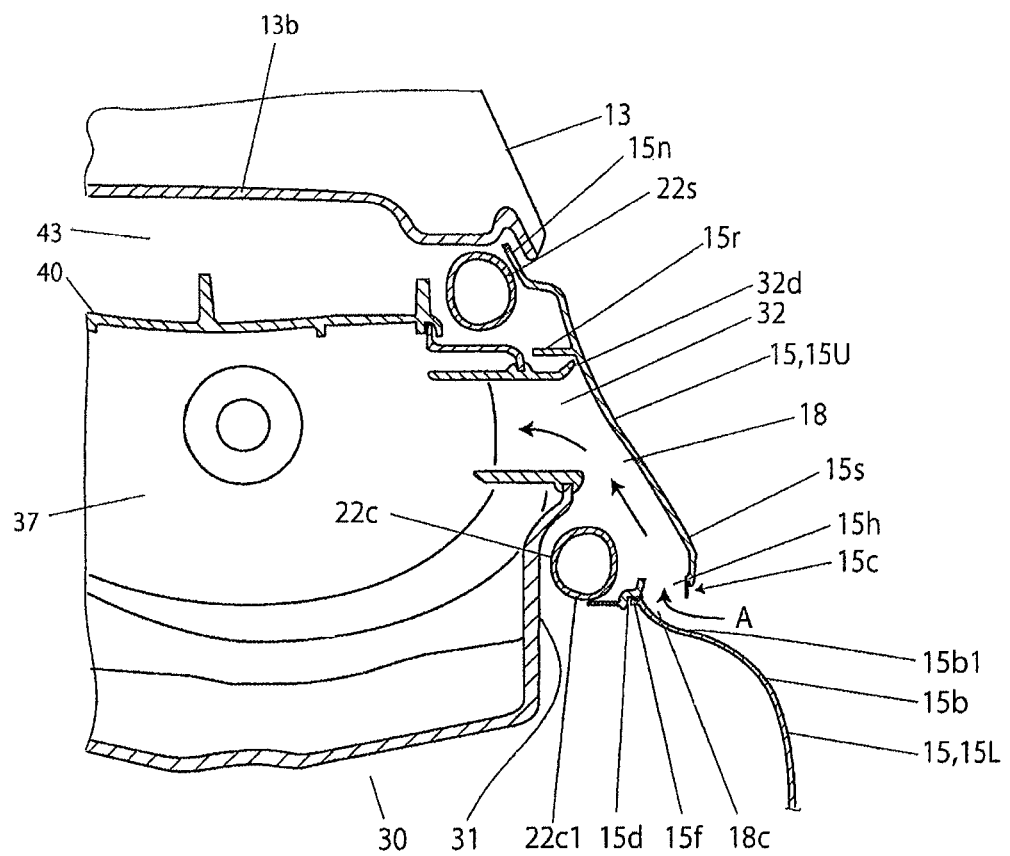
FIG. 6 is a partial-omitted cross-sectional view taken along line 6-6 in FIG. 4.

As shown in FIGS. 4 to 6, the intake structure for the saddle-ride type vehicle according to the embodiment is characterized by the following. An upper wall 35 of the intake air cleaner case 30 is partially provided with an air taking-in port 41. An upper wall surface communicating with the taking-in port 41 is formed with a concave portion 42. The concave portion 42 and a bottom plate 13b of the seat 13 opposed to the concave portion 42 define an intake passage 43 communicating with the taking-in port 41.

According to the intake structure for the saddle-ride type vehicle, the upper wall 35 of the intake air cleaner case 30 is partially provided with the air taking-in port 41. The concave portion 42 and the bottom plate 13b of the seat 13 define the intake passage 43 communicating with the taking-in port 41.

While the intake passage 43 might not be a complete duct, it is configured as an intake passage similar to a duct (i.e., a pseudo duct) by the concave portion 42 of the upper wall surface of the intake air cleaner case 30 and the bottom plate 13b of the seat 13.

In this way, the present embodiment can make the intake passage (hereinafter also referred to as the pseudo duct) 43 longer than the duct installed to extend from the rear portion of the cleaner case toward the rear in a conventional technology. The degree of freedom of the length of the duct can be increased accordingly. In addition, the upper portion of the pseudo duct 43 is formed of the bottom plate 13b of the seat 13. Therefore, it becomes easy to ensure also the capacity of the intake air cleaner case 30. As a result, it is possible to improve the intake performance of the intake air cleaner case 30.

Figure 13:
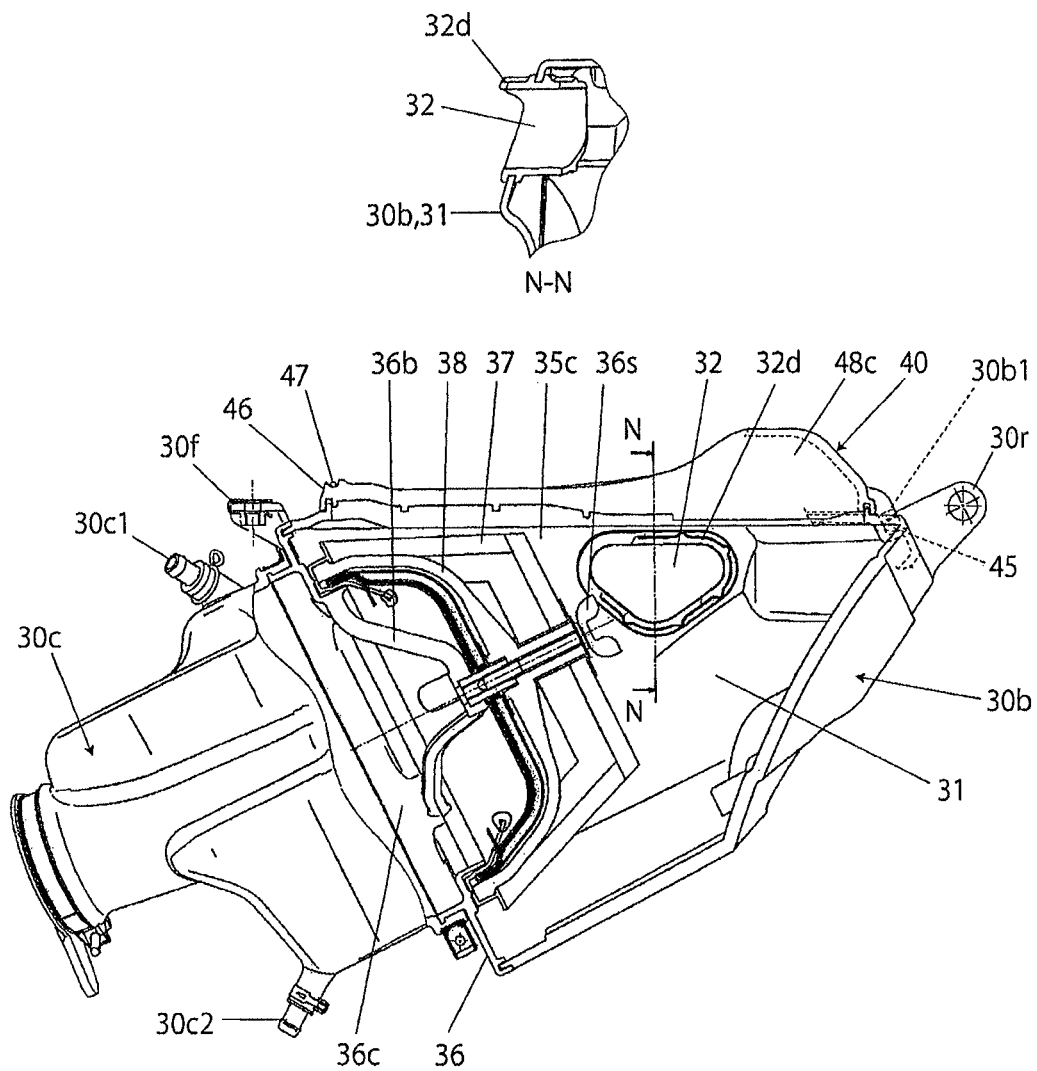
FIG. 13 is a perspective view of a side cover and an opening as viewed from obliquely rearward and below.
Figure 14:
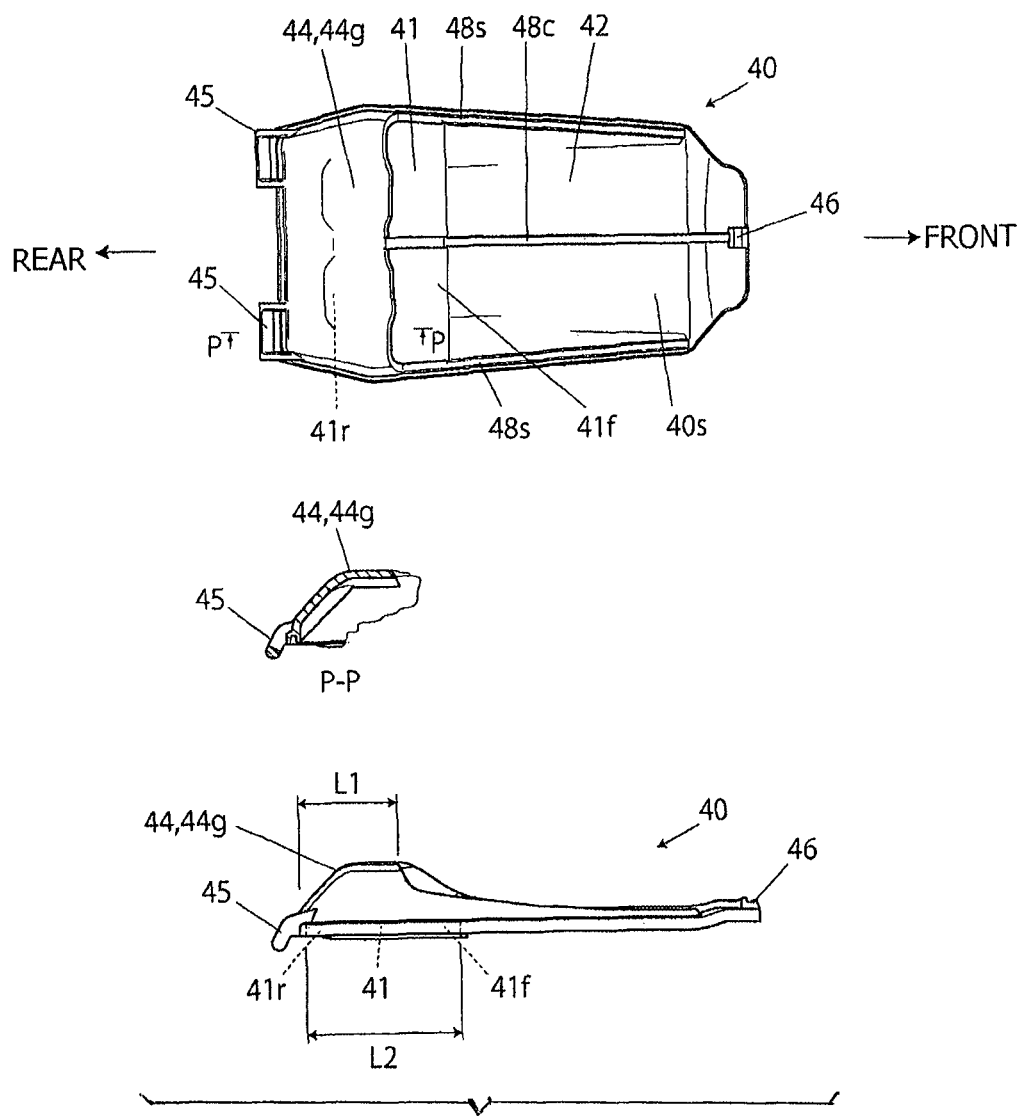
FIG. 14 is a partial-omitted cross-sectional view taken along line 14-14 in FIG. 3.

As shown in FIGS. 13 and 14, the cleaner case 30 includes a case body 30b, a connecting tube 30c and a lid member 40.

As shown in FIGS. 13 and 14, a front plate 36 of the case body 30b is provided integrally with an element support portion 36b supporting a cleaner element 37. The cleaner element 37 is attached to an element base 38 supporting the cleaner element 37 in a replaceable manner. In addition, the cleaner element 37, along with the element base 38, is detachably attached to the element support portion 36b by means of screws 36s. The front plate 36 is fixedly fastened to the front surface of the case body 30b by means of a plurality of (four shown in FIGS. 10, 12, and 13) screws 36v.

The lid member 40 is provided on an upper opening 35c provided in the upper wall 35 of the case body 30b in an openable and closable manner.

The replacement of the cleaner element 37 can be done by opening the lid member 40.

One side surface 31 of the case body 30b is provided with a side taking-in port 41 adapted to take in air from the side. As can be seen in FIGS. 6, 10, 11, and 13, the side taking-in port 41 is formed with a duct member 32*d* attached to the case body 30*b*.

The connecting tube 30*c* connects an opening 36*c* provided in the front plate 36 with a throttle body 12*s* (see FIG. 1) to form an intake passage 34 (FIG. 5) extending toward the engine 12 via a throttle body 12*s*.

Accordingly, air taken from the taking-in port 41 and the side taking-in port 32 into the case body 30*b* is purified by the cleaner element 37, then passes through the connecting tube 30*c* and the throttle body 12*s* and is supplied to the engine 12. Pipes 30*c*1 and 30*c*2 are provided for connecting breather tubes.

Figure 10:
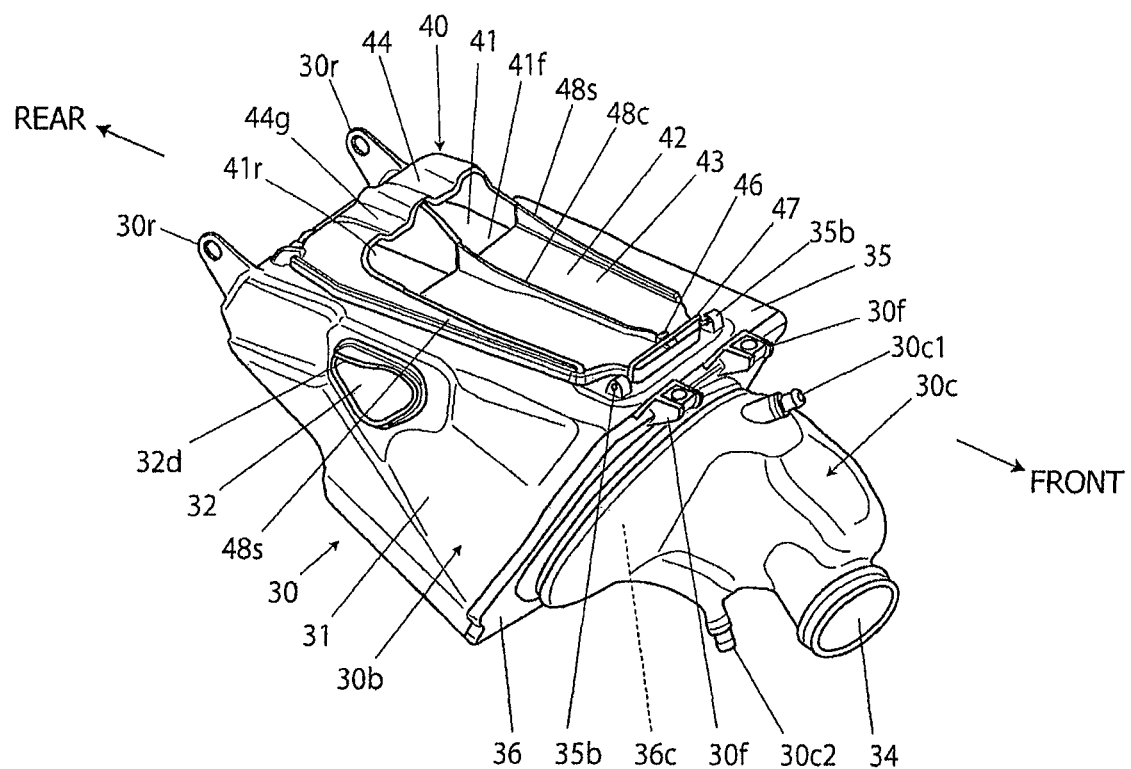
FIG. 10 is an explanatory view of an engaging structure between a case body 30b and the lid member 40.

As shown in FIGS. 4, 10 and 14, the taking-in port 41 and the concave portion 42 are formed in the lid member 40 opened and closed to replace the element 37. The lid member 40 is formed with a duct portion 44 covering one end (a portion other than the portion 41*f* on the concave portion 42 side) 41*r* of the taking-in port 41. As shown in FIGS. 10, 11 and 14, a length L1 of a guide wall 44*g* of the duct portion 44 opposed to the taking-in port 41 is shorter than a length L2 of the taking-in port 41, the length L1 extending in a direction toward the concave portion 42.

With this configuration, the taking-in port 41 and the concave portion 42 is formed in the lid member 40. Therefore, the taking-in port 41 and the concave portion 42 can be easily formed as compared with the case of being formed in the case body 30*b*.

The taking-in port 41 is formed with the duct portion 44 covering one end of the taking-in port 41. Therefore, the operation of the duct portion 44 can increase the intake efficiency.

The length L1 of the guide wall 44*g* of the duct portion 44 opposed to the taking-in portion 41 is shorter than the length L2 of the taking-in port 41, the length L1 extending in the direction toward the concave portion 42. Therefore, the lid member 40 having the above-mentioned duct portion 44 can be formed as a vertical division type.

In short, according to the configuration described above, the intake efficiency can be increased and concurrently the taking-in port 41 and the concave portion 42 can easily be formed.

As shown in FIGS. 13 and 14, the lid member 40 is provided at its rear end with a pair of left and right hook portions 45, each of which is formed in a rectangular U-shape as viewed from above. On the other hand, the case body 30*b* is formed at its rear portion with left and right projecting pieces 30*b*1 (only one is shown) engageable and disengageable with and from the corresponding hook portions 45.

As shown in FIGS. 13 and 14, a spring-hook portion 46 is formed at a front end of the lid member 40. On the other hand, as shown in FIG. 14 and the like, a bar-spring (a linear spring) 47 is turnably attached to a pair of left and right support portions 35*b* installed at the front portion of the upper wall 35 of the case body 30*b*. The bar-spring 47 has both ends each formed to bend like a crank.

The lid member 40 is removably attached to the case body 30*b* in a way as described below. The hook portions 45 are hooked on the projecting pieces 30*b*1 of the case body 30*b* so as to close the upper opening 35*c* of the case body 30*b*. In addition, the bar-spring 47 is turned and engaged with the spring-hook portion 46 by the use of its elasticity.

Figure 16:
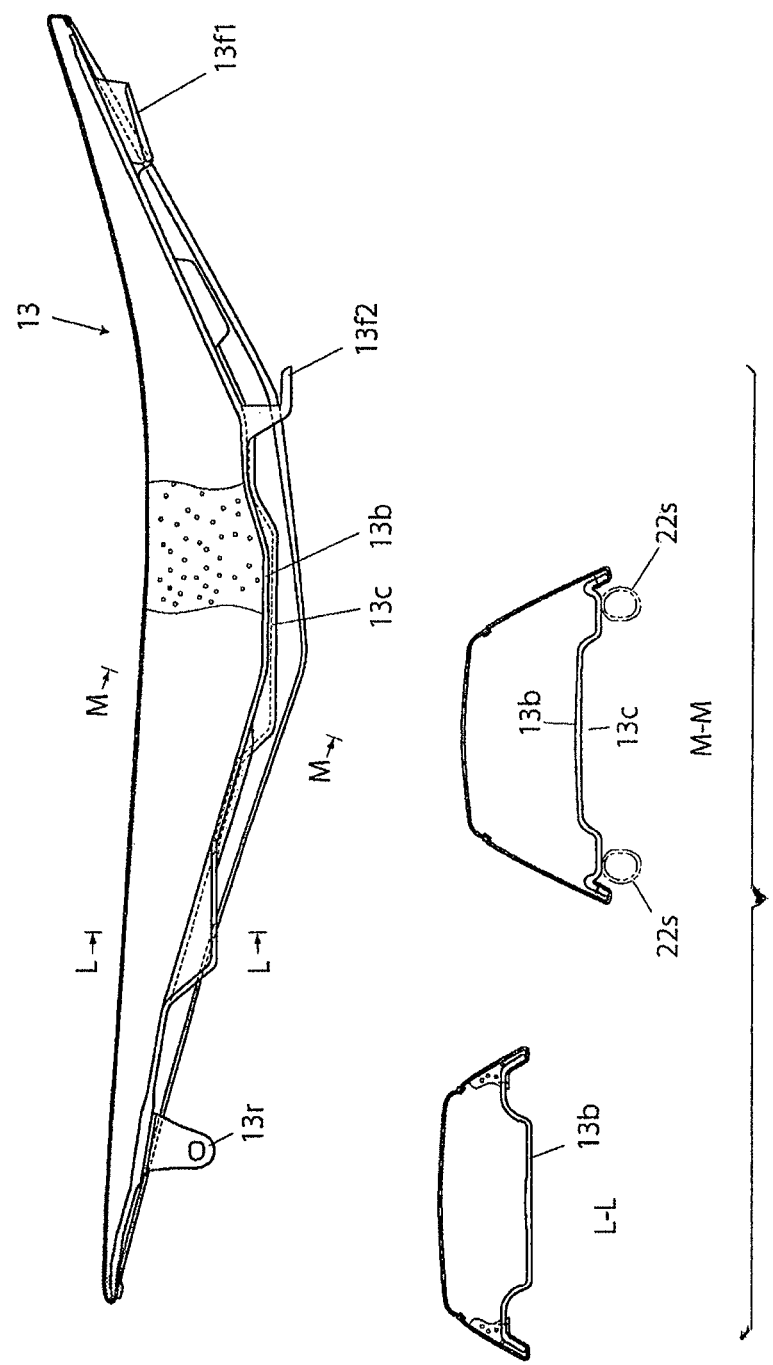
FIG. 16 includes a lateral view of the upper cover, and cross-sectional views of associated portions of the upper cover.
Figure 17:
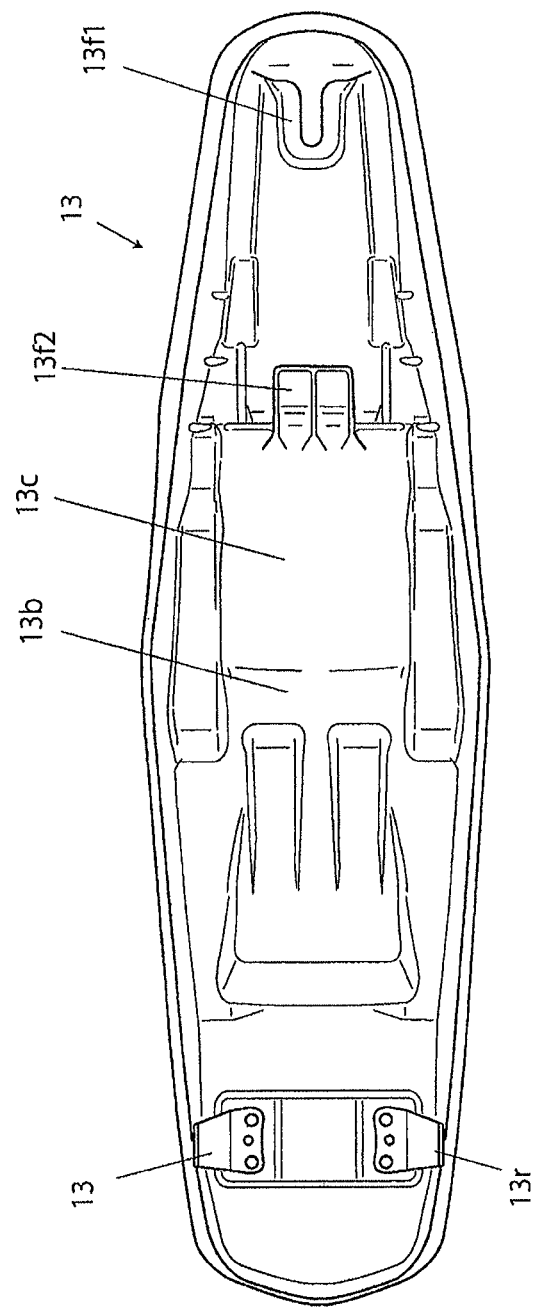
FIG. 17 is a top view of a lower cover.

As shown in FIGS. 16, 11, and 17, the bottom plate 13*b* of the seat 13 is formed with a seat side concave portion 13*c*. The seat side concave portion 13*c* is concaved upward and opposed to the concave portion 42 on the intake air cleaner case 30 side.

With this configuration, the degree of freedom of the magnitude of the transverse sectional area of the pseudo duct 43 is increased and concurrently the rigidity of the bottom plate 13*b* of the seat 13 can be increased. As a result, while enhancing the quality of the ride of the vehicle, a weight saving can be achieved.

As shown in FIGS. 4, 10, and 14, the taking-in port 41 is provided at an end of the cleaner case 30 in the front-back direction of the vehicle. In addition, the seat 13 side concave portion 13*c* is formed along the longitudinal direction of the seat 13 in the front-back direction.

With this configuration, the pseudo duct 43 can be formed more elongated to allow for increased intake efficiency. Concurrently, also the rigidity of the seat 13 can be increased.

As shown in FIGS. 4, 10, and 14, the taking-in port 41 and the duct portion 44 are installed in the rear portion of the lid member 40. As shown in FIGS. 10 and 11, the concave portion 42 is formed of an upper surface 40*s* of the lid member 40, left and right ribs 48*s* integrally extending forward from the taking-in port 41 and the duct portion 44, and a central rib 48*c*. Both of the left and right ribs 48*s* and central rib 48*c* are gradually increased in height as they go from the front toward the duct portion 44. The central rib 48*c* sections the duct portion 44 into left and right parts (see FIGS. 10, 11, and 14).

This configuration provides a moderate straightening effect of an air flow which moves in the pseudo duct 43 from the front toward the duct portion 44, thereby enhancing intake efficiency.

The duct portion 44 is opened toward the front of the vehicle. Air is taken in from the front side at a position away from the rear wheel 11*r*. Thus, the entering of dust or the like can be reduced to extend the life of the element 37.

As shown in FIGS. 4 and 6, the seat 13 is supported above frames (shown in the figure are seat support portions 22*s*) extending in the front-back direction on the left and right of the seat 13. Left and right sidewalls of the pseudo duct 43 are formed of the frames (22*s*).

With the configuration described above, the elongated pseudo duct 43 can be formed effectively using the frames and also a weight saving of the vehicle can be achieved.

As shown in FIG. 5 and the like, the cleaner case 30 is provided at its front portion with a pair of left and right front-side attachment portions 30*f*, 30*f* and at its rear portion with a pair of left and right rear-side attachment portions 30*r*, 30*r*. The front-side attachment portions 30*f* are integrally provided on the upper portion of the front plate 36. The rear-side attachment portions 30*r* are integrally provided at the rear end of the case body 30*b*.

As shown in FIGS. 4 and 6, the cleaner case 30 is mounted on the rear frame 22 in a way as described below. The front-side attachment portions 30*f*, 30*f* are fixedly fastened to respective cleaner case securing portions 24 by means of bolts 24*b*. The cleaner case securing portions 24 are secured to the cross member 22*j* connecting the front portions of the seat support portions 22*s* of the rear frame 22. The rear-side attachment portions 30*r*, 30*r* are fixedly fastened to cleaner case securing portions 22*s*4 shown in FIG. 4 by means of bolts and nuts (not shown).

Figure 12:
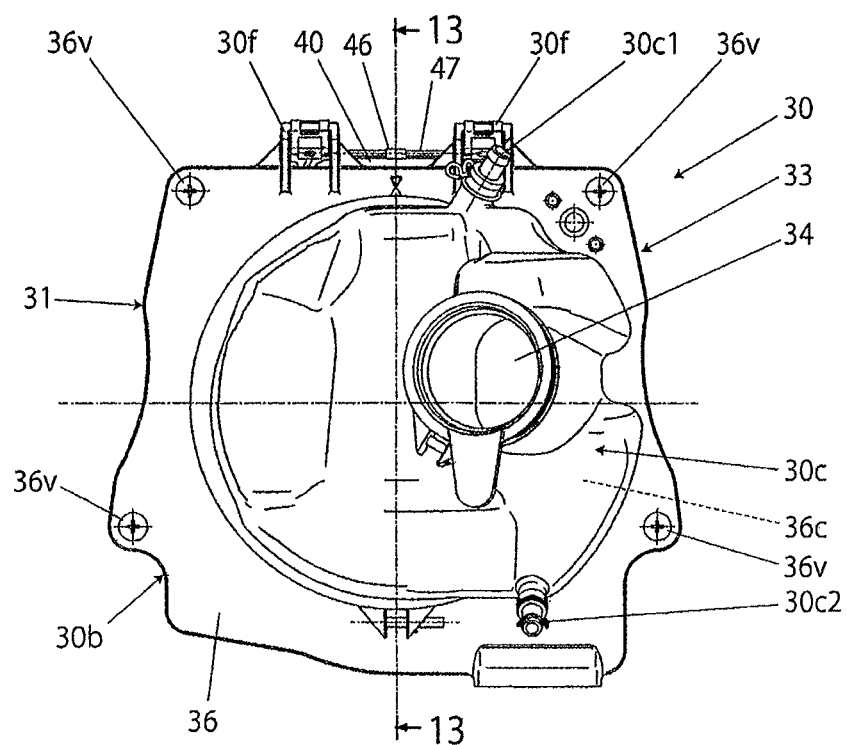
FIG. 12 is a bottom view of the seat.

As shown in FIGS. 11 and 12, the bottom plate 13*b* of the seat 13 is provided integrally with a first hook 13*f*1 and second hooks 13*f*2 on the front side thereof and with a pair of left and right attachment portions (attachment lugs) 13*r*, 13*r* on the rear side thereof.

The seat 13 is mounted on the fuel tank 16 and the rear frame 22 in a way as described below. As shown in FIG. 1, the first hook 13*f*1 is engaged with an engaging pin (not shown) installed on the upper surface of the fuel tank 16. As shown in FIG. 4, the second hook 13f2 is engaged with the cross member 22j. The attachment portions 13r, 13r are fixedly fastened to the securing portions 22s3 shown in FIG. 4 by means of bolts and nuts not shown.

As shown in FIGS. 3, 13 and 14, the intake structure for a saddle-ride type vehicle according to the present embodiment is such that the side cover 15 is provided with a stepped surface 15d extending toward the inside of the vehicle from an external surface 15s thereof. The stepped surface 15d is provided with an opening 15h opened toward the downside at a position not overlapping, as viewed from the side, a leg (ML) of an occupant M who sits on the seat 13 and takes a posture of putting her or his feet on the steps 14 (FIG. 1). The side taking-in port 32 mentioned earlier adapted to take air in the intake air cleaner case 30 is provided in the side surface 31 of the cleaner case 30. An air introduction passage 18 extending from the opening 15h toward the side taking-in port 32 is formed inside the side cover 15.

With this configuration, air A (see arrow A in FIG. 14) is taken in from the opening 15h provided in the side cover 15 through the air introduction passage 18 formed inside the side cover 15, and through the side taking-in port 32 of the intake air cleaner case 30 into the intake air cleaner case 30. The side taking-in port 32 is covered by the side cover 15. In addition, the opening 15h is provided in the stepped surface 15d extending toward the inside of the vehicle from the external surface 15s of the side cover 15 so as to open downward. Therefore, entering of dust or the like into the opening 15h is suppressed. Thus, the entering of dust or the like into the cleaner case 30 can be reduced.

The side cover 15 is provided with the stepped surface 15d extending toward the inside of the vehicle from the external surface 15s thereof. The stepped surface 15d is provided with the opening 15h opened downwardly at a position not overlapping, as viewed from the side, a leg ML of an occupant M who sits on the seat 13 and takes a posture of putting her or his feet on the steps 14. The air introduction passage 18 extending from the opening 15h toward the side taking-in port 32 is formed inside the side cover 15. Although the side surface 31 of the cleaner case 30 is provided with the side taking-in port 32 for air A, an amount of taken-in air A can be ensured while maintaining the external appearance of the vehicle 10. More specifically, the opening 15h is provided at a position not overlapping, as viewed from the side, a leg ML of an occupant M who sits on the seat 13 and takes a posture of putting her or his feet on the steps 14. Further, the opening 15h is provided in the stepped surface 15d extending toward the inside of the vehicle from the external surface 15s of the side cover 15 so as to open downwardly. Therefore, a situation where the opening 15h is blocked by the leg ML of an occupant M hardly occurs and concurrently the opening 15h is inconspicuous from the outside. Thus, an amount of taken-in air A can be ensured while maintaining the external appearance of the vehicle. In addition, it becomes hard for the opening 15h to suck mud or sand thrown up by this vehicle or another vehicle.

The position of the opening 15h may be any position as long as it does not overlap, as viewed from the side, a leg ML of an occupant M who sits on the seat 13 and takes a posture of putting her or his feet on the steps 14 as described above. However, it is desirable that the opening 15h be located in the rear of the step 14 in the front-back direction of the vehicle as shown in FIG. 1.

With this configuration, the situation where the opening 15h is blocked by the leg ML of an occupant M hardly occurs.

As shown in FIGS. 3 and 13, the opening 15h in the present embodiment is opened not only downwardly but also obliquely rearwardly.

With this configuration, it becomes harder for the opening 15h to suck mud or sand thrown up by the own vehicle or other vehicles.

As mainly shown in FIG. 14, the side cover 15 is composed of an upper cover 15U and a lower cover 15L. The stepped surface 15d and the opening 15h are located at a lower side 15c of the upper cover 15U. The lower cover 15L is formed as a muffler cover. The muffler cover bulges laterally outward of the vehicle to form a bulging portion 15b which covers the muffler 17 of the vehicle. An upper surface 15b1 of the bulging portion 15b is made to face the opening 15h with an interval put therebetween.

With this configuration, the bulging portion 15b of the muffler cover (15L) makes the opening 15h more inconspicuous. Therefore, the external appearance of the vehicle can be enhanced.

The air introduction passage 18 is formed with a bending passage 18c that extends toward the opening 15h from the upper surface 15b1 of the bulging portion 15b of the muffler cover. Thus, the entering of dust can be reduced accordingly.

As mainly shown in FIGS. 3, 4 and 14, the upper side 15f of the muffler cover (15L) is located along a lower edge 22c1 of the body frame 20 (the tilt portion 22c of the rear frame 22 in the embodiment) on which the intake air cleaner case 30 is mounted. In addition, the body frame 20 (the tilt portion 22c of the rear frame 22) forms a portion of the air introduction passage 18.

With this configuration, a portion of the air introduction passage 18 is formed by the body frame 20 and the lower cover 15L can be reduced in size accordingly.

As shown in FIG. 4, the side taking-in port 32 of the intake air cleaner case 30 is disposed in a narrow angle portion 22d (see FIG. 2) formed between the seat support portion 22s and tilt portion 22c of the body frame 20.

With this configuration, the air introduction passage 18 can be formed by effectively using the frame (22c, 22s) and concurrently the frame (22c, 22s) can be used as a prevention wall for reducing dust or the like from entering.

Figure 7:
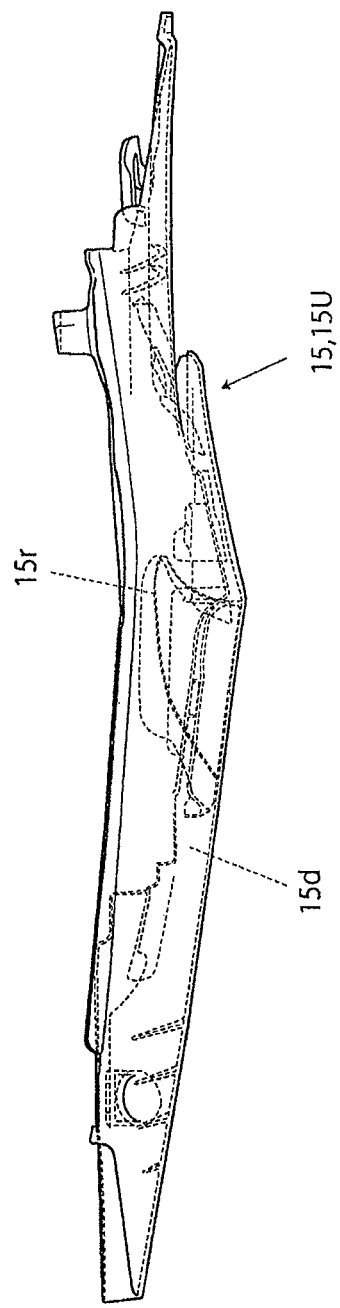
FIG. 7 is a front view of the intake air cleaner case.
Figure 8:
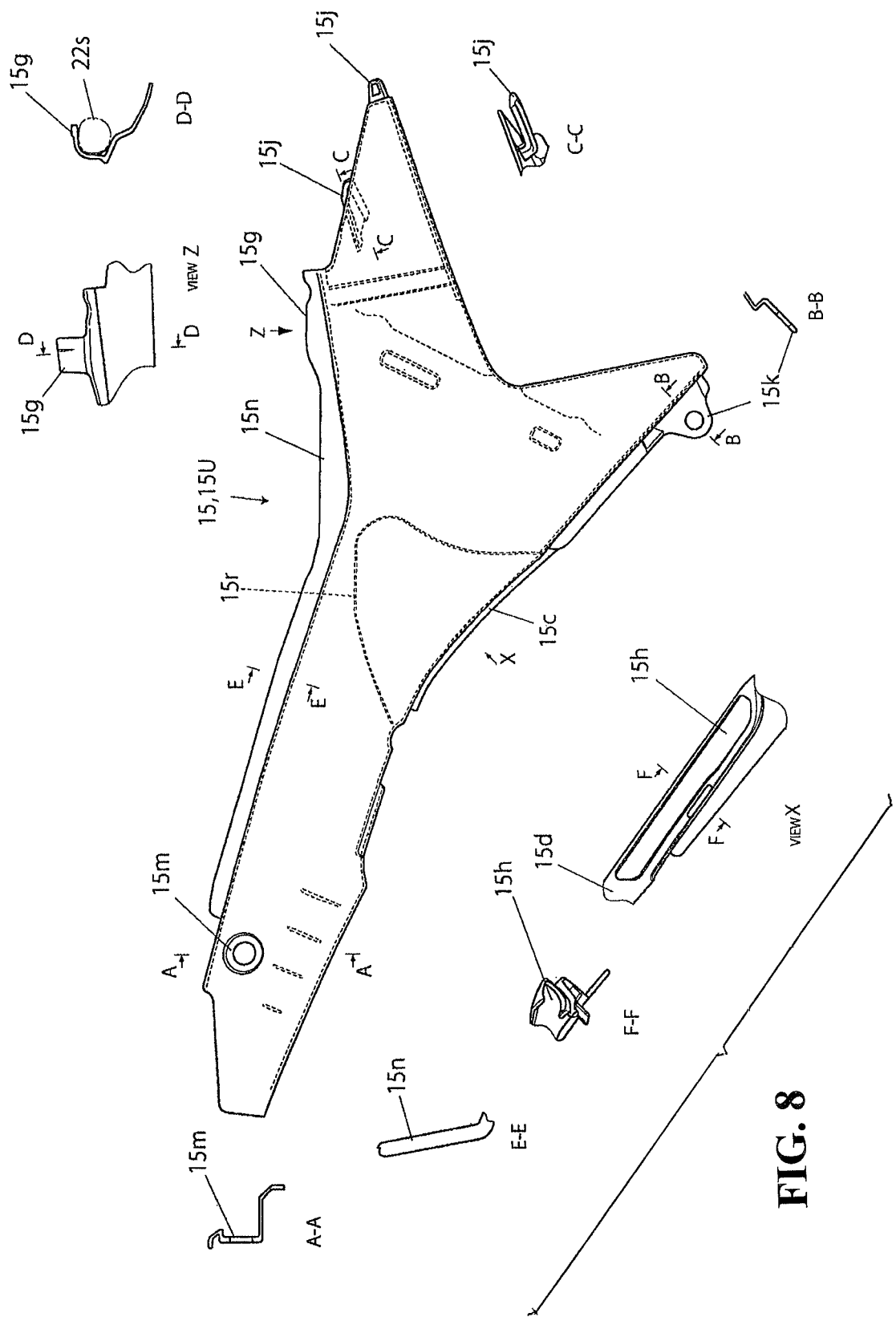
FIG. 8 includes cross-sectional views taken along lines 8-8 and N-N in FIG. 7.
Figure 9:
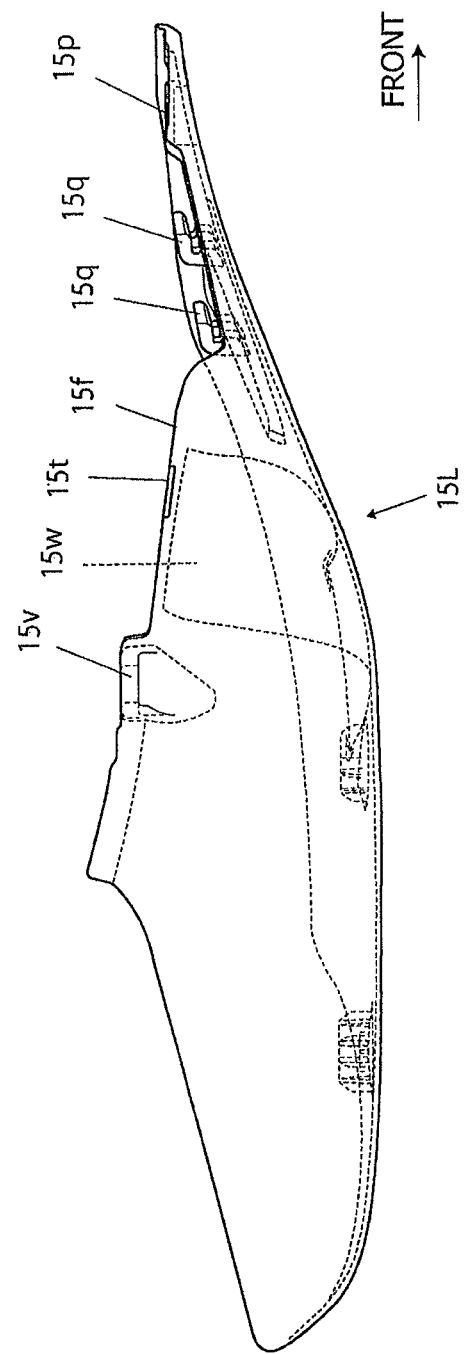
FIG. 9 includes a top view, a cross-sectional view taken along line P-P and a lateral view of the lid member.

As shown in FIG. 6, the side taking-in port 32 is provided on only one of the side surfaces 31 of the intake air cleaner case 30. As shown in FIG. 7, the intake passage 34 extending from the intake air cleaner case 30 toward the engine 12 is located so as to be offset toward the other side surface 33.

With this configuration, the other side surface 33 of the cleaner case 30 can be made to act as a reflection surface for the air A flowing into the cleaner case 30 from the side taking-in port 32. In addition, the flow of the air A toward the intake passage 34 from the side taking-in port 32 can be made smooth to improve intake performance.

The side taking-in port 32 is formed by a duct member 32d attached to the case body 30b.

In addition, the duct member 32d is configured to prevent the entering of dust or the like by making gaps defined in cooperation with the upper side and front side of the upper cover 15U narrower than those in cooperation with the rear side and lower side thereof (see FIGS. 6 and 11).

Figure 15:
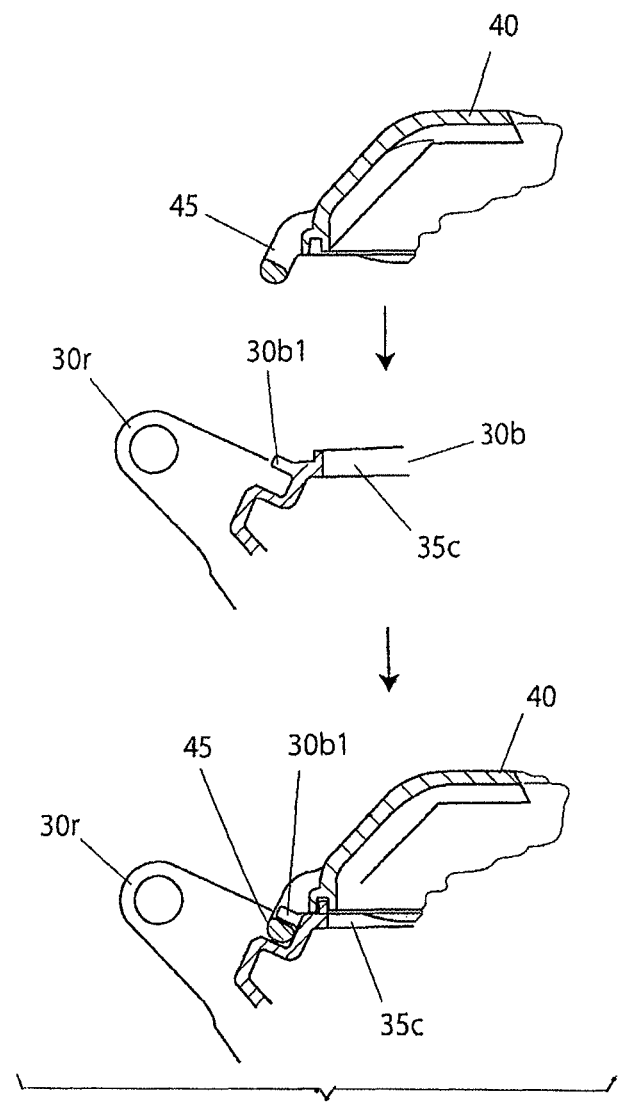
FIG. 15 is a top view of an upper cover.

As shown in FIGS. 3, 15 and 16, the side cover 15 is provided on its inner surface with a rib 15r forming the air introduction passage 18.

This configuration can make the flow of the air A in the air introduction passage 18 smoother and concurrently increase the strength of the side cover 15.

As shown in FIGS. 15 and 16, the upper cover 15U is a roughly Y-shaped cover that has a vertically divided front portion as viewed from the side (FIG. 16). This front portion is provided at its upper portion with a hook portion 15g hooked on the seat support portion 22s and engaging portions 15j, 15j engaged with the front side cover 19 (see FIGS. 1 and 3). In addition, the front portion is provided at its lower portion with an attachment portion 15k attached to the tilt portion 22c of the frame. Further, the upper cover 15U is provided at its rear portion with an attachment portion 15m attached to the seat securing portion 22s3 of the rear plate 22s2 of the rear frame 22 described earlier.

The upper cover 15U is mounted on the side portion of the vehicle body in a way as described below. The hook portion 15g is hooked on the seat support portion 22s. The engaging portions 15j, 15j are engaged with engaging portions not shown of the front side cover 19. The attachment portion 15k is fixedly fastened to the cover securing portion 22c2 (see FIGS. 2 and 3) of the tilt portion 22c of the frame by means of bolts and nuts (not shown). The attachment portion 15m is fixedly fastened to the seat securing portion 22s3 of the rear plate 22s2 along with the attachment portion 13r of the seat 13 by means of bolts and nuts (not shown).

A projecting piece 15n extending in the front-back direction is provided on the upper side of the upper cover 15U. The projecting piece 15n enters the inside of the side portion of the seat 13 (see FIG. 14).

As shown in FIG. 17, the lower cover 15L has an attachment portion 15p installed at its leading end and attached to a cover securing portion 22c2 (see FIGS. 2 and 3) of the tilt portion 22c of the frame; engaging portions 15q, 15q and 15t engaged with the upper cover 15U installed in the front portion of the upper side portion 15f; an attachment portion 15v located slightly rearward of the upper side portion 15f and attached to the side cover securing portion 22s5 of the rear plate 22s2 of the rear frame 22 described earlier; and a heat guard 15w.

The lower cover 15L is mounted to the side portion of the vehicle body at a position below the upper cover 15U in a way as described below. The engaging portions 15q, 15q and 15t are engaged with the upper cover 15U in such a manner that the upper side portion 15f is joined to the lower side of the upper cover 15U. The attachment portion 15p is fixedly fastened to the cover securing portion 22c2 (see FIGS. 2 and 3) of the tilt portion 22c of the frame along with the attachment portion 15k of the upper cover 15U by means of bolts and nuts (not shown). The attachment portion 15v is fixedly fastened to the side cover securing portion 22s5 by mean of a bolt and a nut (not shown).

The present embodiment of the invention has been described thus far. However, the present invention is not limited to the embodiment described above. The invention can arbitrarily be modified and executed within a range of the gist thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An intake structure for a saddle-ride vehicle including an engine disposed between a front wheel and a rear wheel, an occupant's seat disposed to extend from above the engine to rearward thereof and an intake air cleaner case installed below the seat, comprising:

an air taking-in port provided at a portion of an upper wall of the intake air cleaner case; and a concave portion formed on an upper wall surface communicating with the taking-in port;

said concave portion and a bottom plate of the seat facing the concave portion forms an intake passage communicating with the taking-in port, the intake structure further comprising:

a central rib dividing the concave portion into left and right concave sections extending in a front to back direction of the intake structure.

2. The intake structure for a saddle-ride vehicle according to claim 1, wherein:

the taking-in port and the concave portion form a lid member opened and closed when an element installed in the intake air cleaner case is replaced, the lid member being formed with a duct portion covering one end of the taking-in port, and a length of a guide wall of the duct portion opposed to the taking-in port is shorter than a length of the taking-in port, the length extending in a direction toward the concave portion.

3. The intake structure for a saddle-ride vehicle according to claim 2, wherein a bottom plate of the seat is formed with a seat side concave portion opposed to the concave portion and concaved upward.

4. The intake structure for a saddle-ride vehicle according to claim 2, wherein the taking-in port is provided at an end portion of the air cleaner case in a front-back direction of the vehicle and a seat side concave portion is formed to extend in the front-back direction along a longitudinal direction of the seat.

5. The intake structure for a saddle-ride vehicle according to claim 2, wherein the seat is supported above a frame extending in the front-back direction on the left and right of the seat and left and right sidewalls of the intake passage are formed of the frame.

6. The intake structure for a saddle-ride vehicle according to claim 1, wherein a bottom plate of the seat is formed with a seat side concave portion opposed to the concave portion and concaved upward.

7. The intake structure for a saddle-ride vehicle according to claim 6, wherein the taking-in port is provided at an end portion of the air cleaner case in a front-back direction of the vehicle and the seat side concave portion is formed to extend in the front-back direction along a longitudinal direction of the seat.

8. The intake structure for a saddle-ride vehicle according to claim 6, wherein the seat is supported above a frame extending in the front-back direction on the left and right of the seat and left and right sidewalls of the intake passage are formed of the frame.

9. The intake structure for a saddle-ride vehicle according to claim 1, wherein the taking-in port is provided at an end portion of the air cleaner case in a front-back direction of the vehicle and a seat side concave portion is formed to extend in the front-back direction along a longitudinal direction of the seat.

10. The intake structure for a saddle-ride vehicle according to claim 1, wherein the seat is supported above a frame extending in the front-back direction on the left and right of the seat and left and right sidewalls of the intake passage are formed of the frame.

* * * * *